United States Patent
Isokangas et al.

(10) Patent No.: US 11,212,715 B2
(45) Date of Patent: Dec. 28, 2021

(54) METHODS AND APPARATUS FOR RADIO RESOURCE MEASUREMENT BETWEEN WIRELESS COMMUNICATION SYSTEMS

(71) Applicant: GUANGDONG OPPO MOBILE TELECOMMUNICATIONS CORP., LTD., Guangdong (CN)

(72) Inventors: Jari Jaakko Isokangas, Tampere (FI); Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/609,951

(22) PCT Filed: Apr. 12, 2018

(86) PCT No.: PCT/CN2018/082756
§ 371 (c)(1),
(2) Date: Oct. 31, 2019

(87) PCT Pub. No.: WO2018/201870
PCT Pub. Date: Nov. 8, 2018

(65) Prior Publication Data
US 2020/0059836 A1    Feb. 20, 2020
US 2021/0274396 A9    Sep. 2, 2021

Related U.S. Application Data

(60) Provisional application No. 62/500,166, filed on May 2, 2017.

(51) Int. Cl.
*H04W 36/00* (2009.01)
(52) U.S. Cl.
CPC ... *H04W 36/0058* (2018.08); *H04W 36/0066* (2013.01); *H04W 36/0069* (2018.08)

(58) Field of Classification Search
None
See application file for complete search history.

(56) References Cited

U.S. PATENT DOCUMENTS

2013/0065612 A1* 3/2013 Siomina ............... H04W 24/02
455/456.2
2014/0056243 A1* 2/2014 Pelletier ............. H04W 52/365
370/329

(Continued)

FOREIGN PATENT DOCUMENTS

CN    103220703 A    7/2013
CN    103974320 A    8/2014

(Continued)

OTHER PUBLICATIONS

3GPP TS 36.300 V13.2.0 (Dec. 2015), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), section 10.1.3.

(Continued)

*Primary Examiner* — Saad Khawar

(57) ABSTRACT

Methods and apparatus for radio resource measurement (RRM) at a user device between two wireless communication systems, the method including obtaining an RRM configuration from a first base station (BS) in a first wireless communication system, sending the RRM configuration to a second BS in a second wireless communication system, receiving, from the second BS, a request for a measurement report, triggering a measurement in the first wireless communication system based on the RRM configuration, and sending the measurement report to the second BS. The measurement report includes a measurement result obtained from the triggered measurement.

16 Claims, 7 Drawing Sheets

(56) References Cited

U.S. PATENT DOCUMENTS

| | | | |
|---|---|---|---|
| 2015/0312957 | A1 | 10/2015 | Pelletier et al. |
| 2015/0358094 | A1 | 12/2015 | Yi et al. |
| 2015/0358848 | A1 | 12/2015 | Kim et al. |
| 2016/0165465 | A1 | 6/2016 | Park et al. |
| 2016/0197692 | A1 | 7/2016 | Yang et al. |
| 2016/0338138 | A1 | 11/2016 | Pelletier et al. |
| 2017/0055187 | A1* | 2/2017 | Kang ............... H04W 36/0058 |
| 2018/0020500 | A1 | 1/2018 | Pelletier et al. |
| 2019/0230515 | A1* | 7/2019 | Quan ................. H04B 17/327 |
| 2019/0274183 | A1 | 9/2019 | Pelletier et al. |

FOREIGN PATENT DOCUMENTS

| | | | |
|---|---|---|---|
| CN | 104247492 | A | 12/2014 |
| CN | 104584633 | A | 4/2015 |
| CN | 104936223 | A | 9/2015 |
| CN | 105208593 | A | 12/2015 |

OTHER PUBLICATIONS

3GPP TS 36.304 V13.0.0 (Dec. 2015), 3rd Generation Partnership Project; Technical Specification Group Radio Access Network; Evolved Universal Terrestrial Radio Access (E-UTRA); User Equipment (UE) procedures in idle mode (Release 13), section 7.

International Search Report in the international application No. PCT/CN2018/082756, dated Jul. 4, 2018.

Written Opinion of the International Search Authority in the international application No. PCT/CN2018/082756, dated Jul. 4, 2018.

Ericssom:"RRM and related control plane aspects for LTE-NR tight-interworking", 3GPP Draft; R2-1700486-RRM Tight Interworking, 3rd Generation Partnershup Project (3GPP), vol. RAN WG2, No. Spokane, USA; Jan. 17, 2017-Jan. 19, 2017 Jan. 17, 2017(Jan. 17, 2017), XP051211058, the whole document.

Ericssom:"Direct SRB between secondary node and UE", 3GPP Draft; R2-1700484-Direct SRB From Secondary Nodeb to UE, 3rd Generation Partnershup Project (3GPP), vol. RAN WG2, No. Spokane, USA; Jan. 17, 2017-Jan. 19, 2017 Jan. 17, 2017(Jan. 17, 2017), XP051211056, the whole document.

"3rd Generation Partnership Project; Technical Specification Group Radio Access Network; Study on New Radio Access Technology; Radio Interface Protocol Aspects (Release 14)", 3GPP Standard; Technical Report; 3GPP TR 38.804, 3rd Generation Partnershup Project (3GPP), vol. RAN WG2, No. V14.0.0, Mar. 24, 2017 (Mar. 24, 2017), pp. 1-57, XP051297619, pp. 15-16, section 5.2; pp. 18-20, section 5.2.2.2, 5.2.2.2.1; pp. 30. sections 5.5.4.5.4.4.1.

Supplementary European Search Report in the European application No. 18794430.1, dated Dec. 4, 2019.

Nokia et al., Measurement coordination in LTE/NR tight interworking, 3GPP TSG-RAN WG2 NR Adhoc R2-1700056, Jan. 6, 2017.

First Office Action of the Chinese application No. 201880024049.7, dated Jun. 12, 2020.

Office Action of the Indian application No. 201917044246, dated Jan. 29, 2021.

* cited by examiner

METHODS AND APPARATUS FOR RADIO RESOURCE MEASUREMENT BETWEEN WIRELESS COMMUNICATION SYSTEMS

CROSS REFERENCE TO RELATED APPLICATION

The present application claims the benefit of priority to U.S. Provisional Application No. 62/500,166, filed on May 2, 2017, the entire contents of which are incorporated herein by reference.

TECHNICAL FIELD

The present application relates to communication systems, and more particularly, to methods and apparatus for measurement and reporting between wireless communication systems.

BACKGROUND

When a user device is connected to two base stations of two radio access systems, respectively, one base station may be a main node and the other may be a secondary node. When one of the two base stations does not connect to a dedicated core network, that one of the two base stations should be the secondary node for the user device. The other of the two base stations can be the main node, and can control and manage those functions that require access to a core network, such as mobility management, and secondary node addition.

The two radio access systems need the user device to measure channel conditions and report measurement results. When the main node needs to manage, for example, mobility of the user device in the radio access system of the secondary node, the main node also should know channel conditions of the user device in the radio access system of the secondary node. However, the user device in existing radio systems does not report to the main node the channel conditions in the radio system of the secondary node.

SUMMARY

Embodiments of the present application provide improved methods and apparatus for measurement and reporting between wireless communication systems.

These embodiments include a method of a user device for radio resource measurement (RRM) between wireless communication systems. The method includes obtaining an RRM configuration from a first base station (BS) in a first wireless communication system; sending the RRM configuration to a second BS in a second wireless communication system; receiving, from the second BS, a request for a measurement report; triggering a measurement in the first wireless communication system based on the RRM configuration; and sending the measurement report to the second BS. The measurement report includes a measurement result obtained from the triggered measurement.

These embodiments also include a method of a user device for radio resource measurement (RRM) between wireless communication systems. The method includes obtaining an RRM configuration from a first base station (BS) in a first wireless communication system, wherein the first BS is configured to send the RRM configuration to the user device and a second BS in a second wireless communication system; receiving, from the second BS, a request for a measurement report; triggering a measurement in the first wireless communication system based on the RRM configuration; and sending the measurement report to the second BS, wherein the measurement report includes a measurement result obtained from the triggered measurement.

These embodiments further include a method for radio resource measurement (RRM) between wireless communication systems. The method includes receiving an RRM configuration determined by a first base station (BS) in a first wireless communication system; sending a request for a measurement report to a user device; receiving the measurement report from the user device, wherein the measurement report includes a measurement result obtained from a measurement based on the RRM configuration in the first wireless communication system, and the user device is communicatively connected to the first BS in the first wireless communication system and a second BS in a second wireless communication system.

These embodiments also include a user device for radio resource measurement (RRM) between wireless communication systems. The user device includes a memory storing instructions and a processor configured to execute the instructions to cause the user device to: obtain an RRM configuration from a first base station (BS) in a first wireless communication system; send the RRM configuration to a second BS in a second wireless communication system; receive, from the second BS, a request for a measurement report; trigger a measurement in the first wireless communication system based on the RRM configuration; and send the measurement report to the second BS. The measurement report includes a measurement result obtained from the triggered measurement.

These embodiments further include a user device for radio resource measurement (RRM) between wireless communication systems. The user device includes a memory storing instructions and a processor configured to execute the instructions to cause the user device to: obtain an RRM configuration from a first base station (BS) in a first wireless communication system, wherein the first BS is configured to send the RRM configuration to the user device and a second BS in a second wireless communication system; receive, from the second BS, a request for a measurement report; trigger a measurement in the first wireless communication system based on the RRM configuration; and send the measurement report to the second BS. The measurement report includes a measurement result obtained from the triggered measurement.

These embodiments further include network apparatus for radio resource measurement (RRM) between wireless communication systems. The network apparatus includes a memory storing instructions and a processor configured to execute the instructions to cause the network apparatus to: receive an RRM configuration determined by a base station (BS) in a first wireless communication system, wherein the network apparatus is in a second wireless communication system; send a request for a measurement report to a user device, wherein the user device is communicatively connected to the BS and the network apparatus; and receive the measurement report from the user device, wherein the measurement report includes a measurement result obtained from a measurement based on the RRM configuration in the first wireless communication system.

These embodiments also include a non-transitory computer-readable medium storing instructions that are executable by one or more processors of an apparatus to perform a method for radio resource measurement (RRM) between wireless communication systems. The method includes obtaining an RRM configuration from a first base station (BS) in a first wireless communication system; sending the RRM configuration to a second BS in a second wireless communication system; receiving, from the second BS, a request for a measurement report; triggering a measurement in the first wireless communication system based on the RRM configuration; and sending the measurement report to the second BS. The measurement report includes a measurement result obtained from the triggered measurement.

These embodiments further include a non-transitory computer-readable medium storing instructions that are executable by one or more processors of an apparatus to perform a method for radio resource measurement (RRM) between wireless communication systems. The method includes obtaining an RRM configuration from a first base station (BS) in a first wireless communication system, wherein the first BS is configured to send the RRM configuration to a user device and a second BS in a second wireless communication system; receiving, from the second BS, a request for a measurement report; triggering a measurement in the first wireless communication system based on the RRM configuration; and sending the measurement report to the second BS. The measurement report includes a measurement result obtained from the triggered measurement.

These embodiments further include a non-transitory computer-readable medium storing instructions that are executable by one or more processors of an apparatus to perform a method for radio resource measurement (RRM) between wireless communication systems. The method includes receiving an RRM configuration determined by a base station (BS) in a first wireless communication system, wherein the apparatus is in a second wireless communication system; sending a request for a measurement report to a user device, wherein the user device is communicatively connected to the BS and the apparatus; receiving the measurement report from the user device. The measurement report includes a measurement result obtained from a measurement based on the RRM configuration in the first wireless communication system.

It is to be understood that the foregoing general description and the following detailed description are exemplary and explanatory only, and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
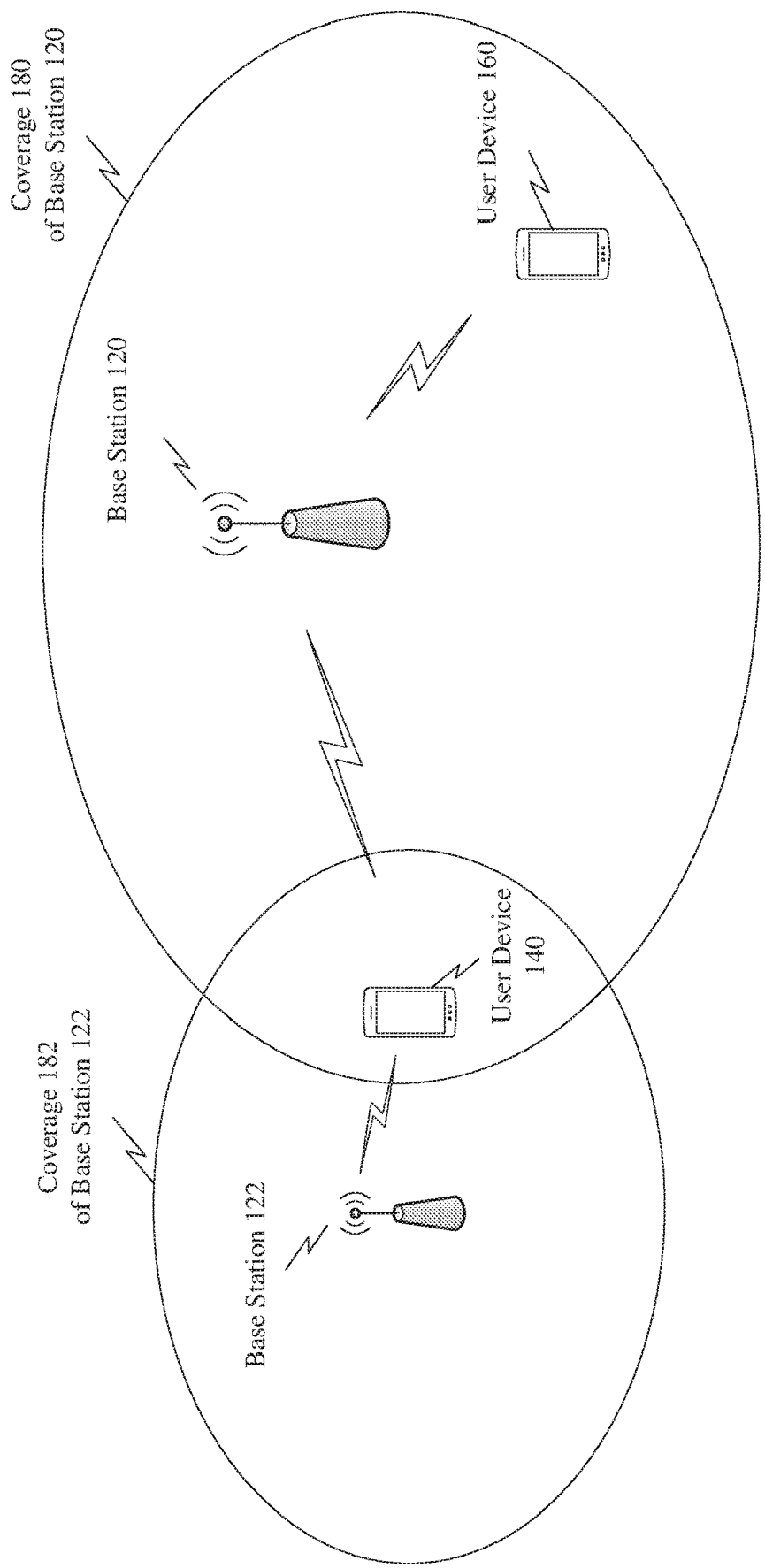
FIG. 1 illustrates an exemplary scenario of two wireless communication systems, according to some embodiments of the present application.

FIG. 1 illustrates an exemplary scenario of two wireless communication systems, according to some embodiments of the present application. For example, as shown in FIG. 1, a user device 140 is within coverage of two wireless communication systems, and connects to the two wireless communication systems. For example, a base station 120 is deployed with an LTE radio access system, with coverage 180 of base station 120 being a range of the LTE radio access system. In another aspect, a base station 122 is deployed with a 5G radio access system, with coverage 182 of base station 122 being a range of the 5G radio access system.

As shown in FIG. 1, the LTE radio access system includes base station 120, user device 140, and a user device 160. Base station 120 is an end node of the LTE wireless communication network. For example, base station 120 can be an evolved node B (eNB), a relay node, or a remote radio head (RRH) in the LTE radio access system. Base station 120 transmits radio signals carrying system information of the LTE radio access system.

A user device within coverage 180 around base station 120 receives the system information. For example, user device 140 within coverage 180 receives the system information, and can access network services through base station 120.

Each of user devices 140 and 160 is a mobile terminal in the wireless communication network. For example, user device 140 or 160 is a smart phone, a network interface card, or a machine type terminal. As another example, user device 140 or 160 is user equipment in the LTE system. Each of user devices 140 and 160 and base station 120 contain communication units that can transmit and receive radio signals. The following description discusses aspects of operating user device 140 in the wireless communication system, it being understood that such description also applies to user device 160.

When user device 140 intends to access network services through base station 120, user device 140 needs to receive control signals from base station 120 to collect system information within coverage 180, such as synchronization and radio resource allocation and schedule. For example, user device 140 in the LTE radio access system needs to receive a physical downlink control channel (PDCCH) to learn whether any data in a physical downlink shared channel is transmitted to user device 140. Accordingly, user device 140 needs to detect a PDCCH among signals transmitted by base station 120.

The LTE radio access system uses OFDM waveforms for wireless communications. As in existing LTE cellular networks, communications are measured in time frames, each frame being divided into slots, and each slot containing multiple OFDM symbols each spanning over multiple frequency subcarriers. Resources are defined in time (OFDM symbols) and frequency (subcarriers).

In another aspect, as shown in FIG. 1, the 5G radio access system includes base station 122, and user device 140. Base station 122 is an end node of the 5G wireless communication network. For example, base station 122 can be a 5G node B (gNB), a relay node, or a remote radio head (RRH) in the 5G radio access system. Base station 122 transmits radio signals carrying system information of the 5G radio access system. A user device within coverage 182 around base station 122 receives the radio signals carrying system information. For example, user device 140 within coverage 182 receives the system information, and can access 5G network services through base station 122.

User device 140 is a mobile terminal in the 5G wireless communication network. For example, user device 140 is a smart phone, a network interface card, or a machine type terminal. As another example, user device 140 is user equipment in the 5G radio access system. User device 140 and base station 122 contain communication units that can transmit and receive radio signals. The following description discusses aspects of operating user device 140 in the 5G wireless communication system, it being understood that such description also applies to a user device connecting to the 5G radio access system.

When user device 140 intends to access network services through base station 122, user device 140 needs to receive control signals from base station 122 to collect system information with coverage 182, such as synchronization and radio resource allocation and schedule. For example, user device 140 in the 5G radio access system needs to receive a physical downlink control channel (PDCCH) to learn whether any data in a physical downlink shared channel is transmitted to user device 140. Accordingly, user device 140 needs to detect a PDCCH among signals transmitted by base station 122.

The 5G radio access system uses OFDM waveforms for wireless communications. As in the 5G wireless communication system, communications are measured in time frames, each frame being divided into slots, and each slot containing multiple OFDM symbols each spanning over multiple frequency subcarriers. Resources are defined in time (OFDM symbols) and frequency (subcarriers).

FIG. 1 shows user device 140 at a position where it can connect to both the LTE and 5G radio access systems. When base station 122 does not connect to a dedicated 5G radio access network and/or core network, but connects to an LTE's radio access network and/or core network, base station 122 should be a secondary node for user device 140 and base station 120 can be a main node for user device 140.

Figure 2:
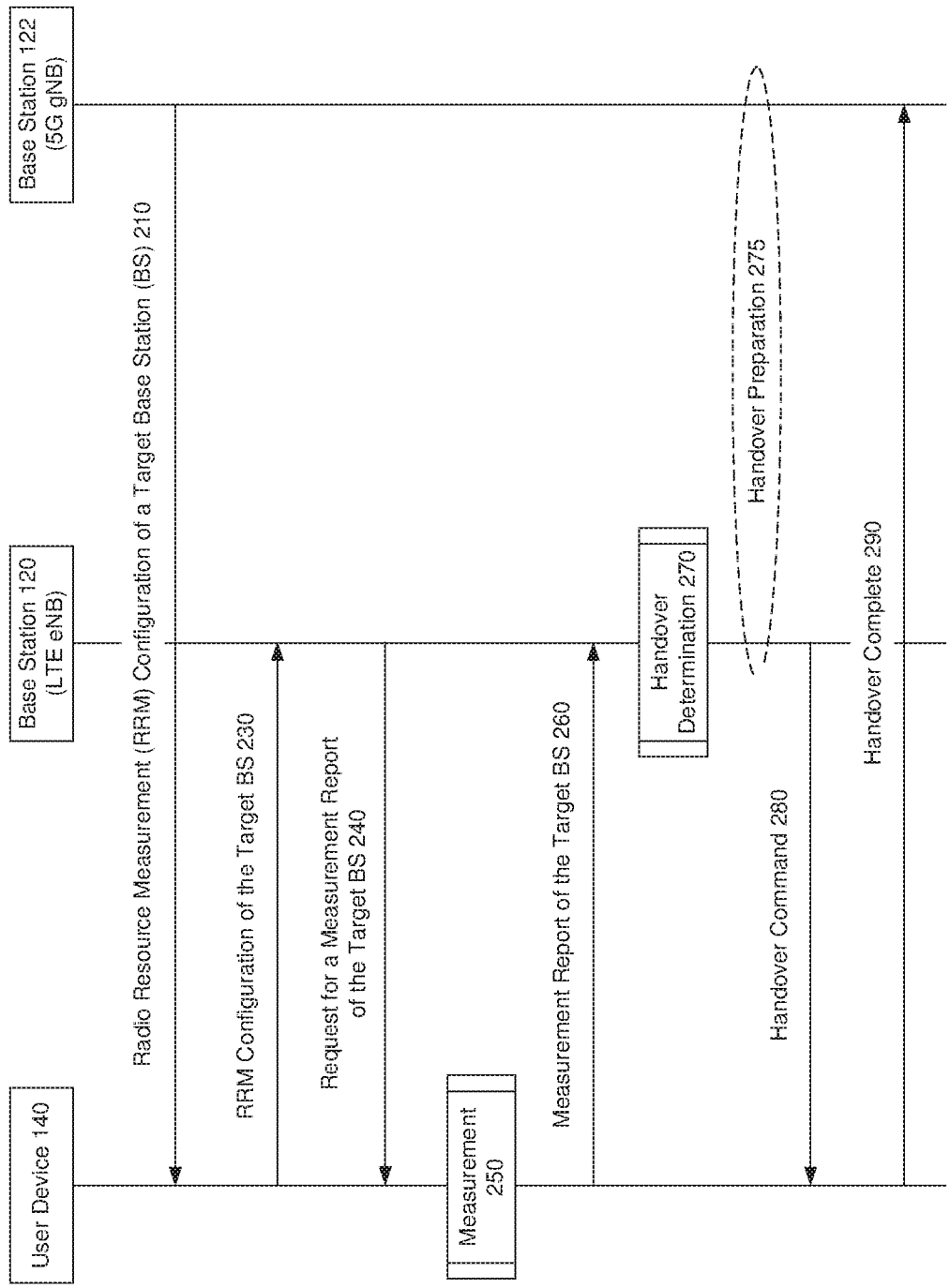
FIG. 2 is a schematic diagram of an exemplary radio resource measurement method between two wireless communication systems, according to some embodiments of the present application.

FIG. 2 is a schematic diagram of an exemplary radio resource measurement method between two wireless communication systems, according to some embodiments of the present application. As shown in FIG. 2, user device 140 simultaneously connects to both base station 120 of the LTE radio access system and base station 122 of the 5G radio access system. Thus, user device 140 has dual connections with two different radio access systems. As noted above, base station 120 is the main node and base station 122 is the secondary node in the dual connectivity of user device 140. User device 140 can transmit and receive signals or data to and from both base stations 120 and 122. From a network perspective, user device 140 is with evolved Universal Mobile Telecommunications System (UMTS) Terrestrial Radio Access Network (E-UTRAN) New Radio (NR) Dual Connectivity (DC), where the E-UTRAN is a radio access network of the LTE radio access system, and NR includes the 5G radio access system or both the 5G radio access system and its radio access network.

As shown in FIG. 2, base station 122 sends an RRM configuration of a target base station to user device 140 (step 210). The RRM configuration of the target BS includes RRM requirements and relevant parameters for user device 140 to measure channel conditions between user device 140 and the target base station in the 5G radio access system.

After user device 140 receives from base station 122 the RRM configuration of the target BS, user device 140 sends an RRM configuration of the target BS to base station 120 (step 230), i.e., a base station of the LTE radio access system. The RRM configuration of the target BS can include all or a subset of the requirements and relevant parameters of the RRM configuration of the target BS.

After receiving the RRM configuration of the target BS in step 230 (i.e., a secondary node), base station 120 can determine required measurements from user device 140 in the 5G radio access system in accordance with the required functions that base station 120 needs to perform. For example, when base station 120 is the main node for user device 140 and manages mobility of user device 140 in the 5G radio access system, base station 120 can determine the measurements required for mobility management in the 5G radio access system to be included in a request for a measurement report from user device 140. For instance, base station 120 can determine both a received signal strength indicator (RSSI) and a reference signal received power (RSRP) of the target BS to be measured by user device 140. Base station 120 can manage mobility of user device 140 in accordance with the measured RSSI and RSRP of the target BS.

As another example, when base station 120 is the main node for user device 140 and manages secondary node addition of user device 140 in the 5G radio access system, base station 120 can determine the measurements required for secondary node addition in the 5G radio access system to be included in a request for a measurement report from user device 140. The secondary node addition is adding a base station in the 5G radio access system as a secondary node for user device 140 that has connected to base station 120. Base station 120 can determine the measurements required for adding a base station of the 5G radio access system as a secondary node for user device 140. For instance, base station 120 can determine synchronization signal (SS)/physical broadcast channel (PBCH) reference signal received power (SS/PBCH-RSRP), channel status indication (CSI) reference signal received power (CSI-RSRP), and RSSI of a base station to be measured in the 5G radio access system for user device 140. Base station 120 can determine whether to add the base station as the secondary node for user device 140 in accordance with the measured SS/PBCH-RSRP, CSI-RSRP, and RSSI.

When base station 120 operates as the main node for user device 140, base station 120 can send a request for a measurement report of the target BS to user device 140 (step 240). The request indicates the determined measurements and/or required measurement results for user device 140 to measure and report. User device 140 performs measurement (step 250) in accordance with the RRM configuration of the target BS in the 5G radio access system. For example, user device 140 measures SS/PBCH-RSRP, RSSI, RSRP, and CSI-RSRP of a potential target base station and base station 122 in the 5G radio access system.

After user device 140 measures and collects measurement results in accordance with the RRM configuration of the target BS, user device 140 sends a measurement report of the target BS to base station 120 (step 260) in accordance with the request for the measurement report of the target BS (step 240).

Base station 120 can perform a handover determination (step 270) in accordance with the measurement report of the target BS (step 260). When a handover criterion is met, base station 120 determines the potential target BS for user device 140 to handover in the 5G radio access system. Base station 120 may perform handover a preparation (step 275) with base station 122 to prepare the handover from base station 122 to the potential target BS in the 5G radio access system.

Alternatively, when the measurement results in the LTE radio access system show that signal quality between base station 120 and user device 140 would result in high bit error rates, base station 120 can send a handover command to user device 140 (step 280) to command user device 140 for a handover from base station 120 of the LTE radio access system to base station 122 of the 5G radio access system. In such a handover, user device 140 releases its connection in the LTE radio access system and only keeps its connection with base station 122 in the 5G radio access system. Thus, use device 140 no longer keeps the dual connectivity with the LTE and 5G radio access systems.

When a handover criterion is met and base station 120 determines to handover, base station 120 sends the handover command to user device 140 (step 280) to command user device 140 to: change its connection in the 5G radio access system from base station 122 to the potential target BS, or change its dual connectivity with the LTE and 5G radio access systems and connect only with the 5G radio access system. After user device 140 completes its handover, user device 140 sends a handover complete to base station 122 (step 290) and releases the connection with base station 122.

Figure 3:
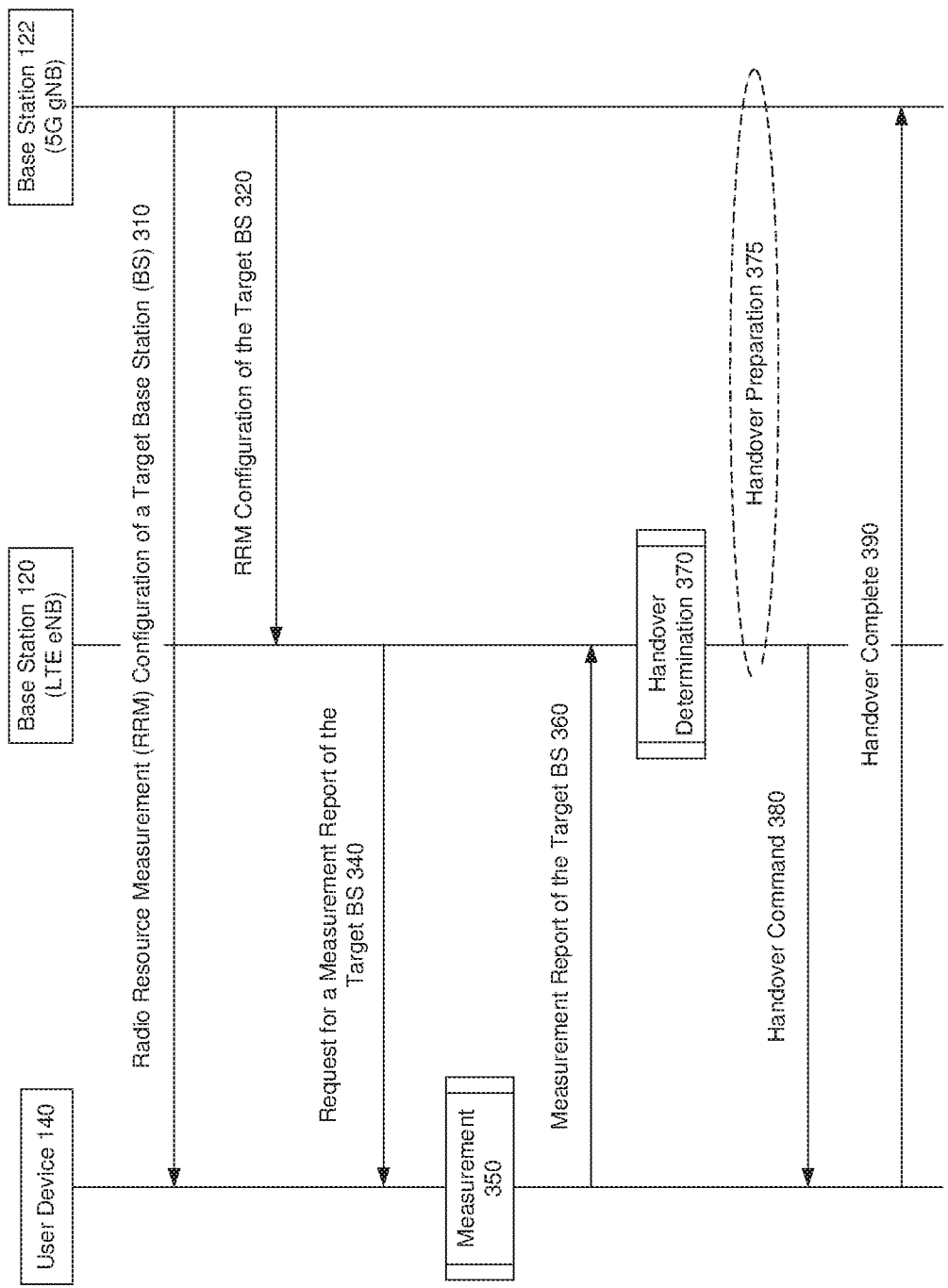
FIG. 3 is a schematic diagram of an exemplary radio resource measurement method between two wireless communication systems, according to some embodiments of the present application.

FIG. 3 is a schematic diagram of an exemplary radio resource measurement method between two wireless communication systems, according to some embodiments of the present application. As shown in FIG. 3, user device 140 simultaneously connects to both base station 120 of the LTE radio access system and base station 122 of the 5G radio access system. Thus, user device 140 has dual connections with two different radio access systems. As noted above, base station 120 is the main node and base station 122 is the secondary node in the dual connectivity of user device 140. User device 140 can transmit and receive signals or data to and from both base stations 120 and 122. From a network perspective, user device 140 is with evolved Universal Mobile Telecommunications System (UMTS) Terrestrial Radio Access Network (E-UTRAN) New Radio (NR) Dual Connectivity (DC), where the E-UTRAN is a radio access network of the LTE radio access system, and NR includes the 5G radio access system or both the 5G radio access system and its radio access network.

As shown in FIG. 3, base station 122 sends an RRM configuration of a target base station to user device 140 (step 310). The RRM configuration of the target BS includes RRM requirements and relevant parameters for user device 140 to measure channel conditions between user device 140 and the target base station in the 5G radio access system.

Base station 122 of the 5G radio access system also sends an RRM configuration of the target base station to base station 120 of the LTE radio access system (step 320). The RRM configuration of the target BS includes all or a subset of the requirements and relevant parameters of RRM configuration of the target BS.

After receiving RRM configuration of the target BS (i.e., a secondary node), base station 120 can determine required measurements from user device 140 in the 5G radio access system in accordance with the required functions that base station 120 needs to perform. For example, when base station 120 is the main node for user device 140 and manages mobility of user device 140 in the 5G radio access system, base station 120 can determine the measurements required for mobility management in the 5G radio access system to be included in a request for a measurement report from user device 140. For instance, base station 120 can determine both RSSI and RSRP of the target BS to be measured by user device 140. Base station 120 can manage mobility of user device 140 in accordance with the measured RSSI and RSRP of the target BS.

As another example, when base station 120 is the main node for user device 140 and manages secondary node addition of user device 140 in the 5G radio access system, base station 120 can determine the measurements required for secondary node addition in the 5G radio access system to be included in a request for a measure report from user device 140. The secondary node addition is adding a base station in the 5G radio access system as a secondary node for user device 140 that has connected to base station 120. Base station 120 can determine the measurements required for adding a base station of the 5G radio access system as a secondary node for user device 140. For instance, base station 120 can determine SS/PBCH-RSRP, CSI-RSRP, and RSSI of a base station to be measured in the 5G radio access system for user device 140. Base station 120 can determine whether to add the base station as the secondary node for user device 140 in accordance with the measured SS/PBCH-RSRP, CSI-RSRP, and RSSI.

When base station 120 operates as the main node for user device 140, base station 120 can send a request for a measurement report of the target BS to user device 140 (step 340). The request indicates the determined measurements and/or required measurement results that user device 140 needs to measure and report. User device 140 performs measurement (step 350) in accordance with RRM configuration of the target BS in the 5G radio access system. For example, user device 140 measures SS/PBCH-RSRP, RSSI, RSRP, and CSI-RSRP of a potential target base station and base station 122 in the 5G radio access system.

After user device 140 measures and collects measurement results in accordance with RRM configuration of the target BS, user device 140 sends a measurement report of the target BS to base station 120 (step 360) in accordance with the request for the measurement report of the target BS (step 340).

Base station 120 can perform a handover determination (step 370) in accordance with measurement report of the target BS (step 360). When a handover criterion is met, base station 120 determines the potential target BS for user device 140 to handover in the 5G radio access system. Base station 120 may perform handover preparation (step 375) with base station 122 to prepare the handover from base station 122 to the potential target BS in the 5G radio access system.

Alternatively, when the measurement results in the LTE radio access system shows that signal quality between base station 120 and user device 140 would result in high bit error rates, base station 120 can send a handover command to user device 140 (step 380) to command user device 140 for a handover from base station 120 of the LTE radio access system to base station 122 of the 5G radio access system. In such a handover, user device 140 releases its connection in the LTE radio access system and only keeps its connection with base station 122 in the 5G radio access system. User device 140 no longer keeps the dual connectivity with the LTE and 5G radio access systems.

When a handover criterion is met and base station 120 determines to handover, base station 120 sends a handover command 380 to user device 140 to command user device 140 to: change its connection in the 5G radio access system from base station 122 to the potential target BS, or change its dual connectivity with the LTE and 5G radio access systems and connect only with the 5G radio access system. After user device 140 completes its handover, user device 140 sends a handover complete to base station 122 (step 390) and releases the connection with base station 122.

In some embodiments, the RRM configuration of a target BS in step 210 or 310, the RRM configuration of the target BS in step 230 or 320, or other RRM configurations within the scope of methods disclosed herein can include, for example, one or more of Secondary Synchronization signal or Physical Broadcast Channel Reference Signal Received Power (SS/PBCH-RSRP), Channel Status Indicator Reference Signal Received Power (CSI-RSRP), Secondary Synchronization, Signal Transmit power, Reference Signal Received Power (RSRP), Reference Signal Received Quality (RSRQ), Universal Terrestrial Radio Access (UTRA) Frequency Divisional Duplex (FDD) Common Pilot Channel (CPICH) Received Signal Coded Power (RSCP), UTRA FDD carrier Received Signal Strength Indicator (RSSI), UTRA FDD CPICH Ec/No, Global System for Mobile Communications (GSM) carrier RSSI, UTRA Time Divisional Duplex (TDD) Primary Common Control Physical Channel (P-CCPCH) RSCP, CDMA2000 Single-Carrier Radio Transmission Technology (1×RTT) Pilot Strength, CDMA2000 High Rate Packet Data (HRPD) Pilot Strength, Reference signal time difference (RSTD), UE Global Navigation Satellite System (GNSS) Timing of Cell Frames for UE positioning, UE GNSS code measurements, UE GNSS carrier phase measurements, UE Receive-Transmit (Rx-Tx) time difference, IEEE 802.11 Wireless Local Area Network (WLAN) Received Signal Strength Indicator (RSSI), Multimedia Broadcast multicast service Single Frequency Network (MBSFN) Reference Signal Received Power (RSRP), MBSFN Reference Signal Received Quality (MBSFN RSRQ), Multicast Channel Block Error Rate (MCH BLER), Channel Status Indicator (CSI) Reference Signal Received Power (CSI-RSRP), Sidelink Reference Signal Received Power (S-RSRP), Sidelink Discovery Reference Signal Received Power (SD-RSRP), Reference signal-signal to noise and interference ratio (RS-SINR), Received Signal Strength Indicator (RSSI), System Frame Number (SFN) and subframe timing difference (SSTD), Narrowband Reference Signal Received Power (NRSRP), Narrowband Reference Signal Received Quality (NRSRQ), Sidelink Received Signal Strength Indicator (S-RSSI), Physical Sidelink Shared Channel (PSSCH) Reference Signal Received Power (PSSCH-RSRP), Channel busy ratio (CBR), or Channel occupancy ratio (CR).

Figure 4:
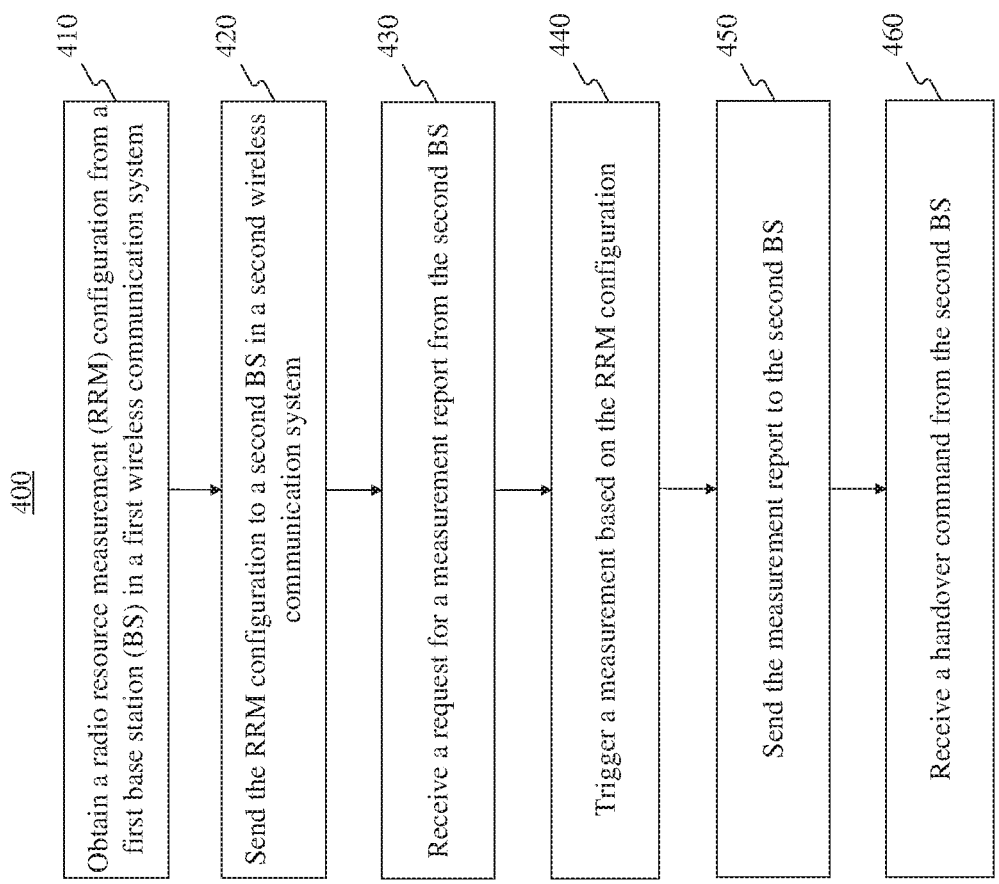
FIG. 4 is a flow chart of an exemplary radio resource measurement method between two wireless communication systems, according to some embodiments of the present application.

FIG. 4 is a flow chart of an exemplary radio resource measurement method 400 between two wireless communication systems, according to some embodiments of the present application. Method 400 may be practiced by user device 140. Method 400 includes obtaining an RRM configuration from a first base station (BS) in a first wireless communication system (step 410), sending the RRM configuration to a second BS in a second wireless communication system (step 420), receiving, from the second BS, a request for a measurement report (step 430), triggering a measurement in the first wireless communication system based on the RRM configuration (step 440), sending the measurement report to the second BS (step 450), and receiving a handover command from the second BS (step 460). The measurement report includes a measurement result obtained from the triggered measurement.

Step 410 includes obtaining an RRM configuration from a first base station (BS) in a first wireless communication system. For example, as shown in FIG. 2 or 3, user device 140 receives from base station 122 the RRM configuration of the target BS in step 210 or 310. The RRM configuration of the target BS includes RRM requirements and relevant parameters for user device 140 to measure channel conditions between user device 140 and the target base station in the 5G radio access system.

Step 420 includes sending the RRM configuration to a second BS in a second wireless communication system. For example, as shown in FIG. 2, user device 140 sends the RRM configuration of the target BS to base station 120 (step 230), i.e., a base station of the LTE radio access system. The RRM configuration of the target BS in step 230 includes all or a subset of the requirements and relevant parameters of the RRM configuration of the target BS in step 210.

In some embodiments, base station 122 sends the RRM configuration to user device 140 and base station 120. For example, as shown in FIG. 3, base station 122 sends RRM configuration of a target BS to user device 140 (step 310) and sends RRM configuration of the target BS to base station 120 (step 320). In such a case, user device 140 does not need to send an RRM configuration of the target BS in the 5G radio access system to base station 120.

Step 430 includes receiving, from the second BS, a request for a measurement report. For example, as shown in FIG. 2 or 3, when base station 120 operates as the main node for user device 140, base station 120 sends a request for a measurement report of the target BS to user device 140 (step 240 or 340). The request indicates the determined measurements and/or required measurement results that user device 140 needs to measure and report. User device 140 receives, from base station 120, a request for the measurement report of the target BS (step 240 or 340).

Step 440 includes triggering a measurement in the first wireless communication system based on the RRM configuration. For example, as shown in FIG. 2 or 3, user device 140 performs the measurement (step 250 or 350) in accordance with the RRM configuration of the target BS (step 210 or 310) in the 5G radio access system. User device 140 measures SS/PBCH-RSRP, RSSI, RSRP, and CSI-RSRP of a potential target base station and base station 122 in the 5G radio access system.

Step 450 includes sending the measurement report to the second BS. For example, as shown in FIG. 2 or 3, user device 140 sends a measurement report of the target BS to base station 120 (step 260 or 360) in accordance with the request for the measurement report of the target BS in step 240 or 340. When base station 120 is the main node for user device 140 and manages mobility of user device 140 in the 5G radio access system, the request for the measurement report of the target BS in step 240 or 340 includes the request for both RSSI and RSRP of the potential target BS and base station 122. Accordingly, user device 140 sends the measurement report of the target BS (step 260 or 360) including RSSIs and RSRPs of the potential target BS and base station 122 to base station 120.

As another example, when base station 120 is the main node for user device 140 and manages secondary node addition of user device 140 in the 5G radio access system, the request for the measurement report of the target BS in step 240 or 340 includes the request for SS/PBCH-RSRP, CSI-RSRP, and RSSI of a potential BS. Accordingly, user device 140 sends the measurement report of the target BS (step 260 or 360) including SS/PBCH-RSRP, CSI-RSRP, and RSSI of the potential target BS to base station 120.

Step 460 includes receiving a handover command from the second BS. For example, as shown in FIG. 2 or 3, user device 140 receives a handover command from base station 120 (step 280 or 380) when a handover criterion is met and base station 120 determines the handover.

In some embodiments, step 430 can include receiving, from the second BS, a configuration index indicating one of a set of RRM configurations to be the RRM configuration for the measurement report. For example, as shown in FIG. 2 or 3, when base station 120 operates as the main node for user device 140, base station 120 sends to user device 140 a request for a measurement report of the target BS (step 240 or 340) that includes a three-bit configuration index indicating one of eight possible RRM configurations. The user device 140 receives, from base station 120, the three-bit configuration index. The received three-bit configuration index includes, for example, "011" indicating that the fourth of eight RRM configurations includes the measurements that user device 140 needs to measure and report. Base station 120 can obtain a mapping between the configuration index and the set of RRM configurations from either base station 122 or user device 140.

In some embodiments, step 450 can include sending the measurement report to the second BS when a criterion for sending a measurement report is met, or when receiving from the second BS a request for reporting. For example, as shown in FIG. 2 or 3, when base station 120 is the main node for user device 140 and manages mobility of user device 140 in the 5G radio access system, user device 140 sends the measurement report when the measured RSSI and RSRP of the potential target BS is 3 dB higher than that of base station 122.

As another example, as shown in FIG. 2 or 3, when base station 120 is the main node for user device 140 and manages secondary node addition of user device 140 in the 5G radio access system, user device 140 sends the measurement report when the measured SS/PBCH-RSRP and CSI-RSRP of a potential BS in the 5G radio access system is greater than a threshold. Exceeding the threshold means that user device 140 can synchronize with and receive system information from the potential BS.

Alternatively, when base station 120 intends to add a second node in the 5G radio access system for user device 140, base station 120 sends a request for user device 140 to report the measurement result. User device 140 sends the measurement report to base station 120 when receiving the request to report therefrom.

In some embodiments, step 450 can include sending to the second BS another kind of measurement report containing the measurement report in the 5G radio access system. The another kind of measurement report is based on another RRM configuration determined by the second BS to measure radio resources in the first and second wireless communication systems. For example, base station 120 sends a request for a measurement report of the target BS (step 240 or 340) that includes requests for measurement results in both the 5G and LTE radio access system from user device 140. User device 140 performs the measurement (step 250 or 350) in both the 5G and LTE radio access systems. User device 140 then sends to base station 120 the measurement report containing measurement results in the 5G radio access system and measurement results in the LTE radio access system.

In some embodiments, the requested measurement report can include all or a subset of measurement results obtained from the triggered measurement. For example, as shown in FIG. 2 or 3, user device 140 performs the measurement (step 250 or 350) in accordance with the RRM configuration of the target BS (step 210 or 310) in the 5G radio access system. Accordingly, user device 140 measures SS/PBCH-RSRP, RSSI, RSRP, and CSI-RSRP of a potential target base station and base station 122 in the 5G radio access system.

When base station 120 is the main node for user device 140 and manages mobility of user device 140 in the 5G radio access system, the request for the measurement report of the target BS in step 240 or 340 includes the request for both RSSI and RSRP of the potential target BS and base station 122. In such a case, the requested measurement report includes a subset of measurement results obtained from the triggered measurement.

Alternatively, when base station 120 is the main node for user device 140 and manages secondary node addition of user device 140 in the 5G radio access system, the request for the measurement report of the target BS in step 240 or 340 includes all of SS/PBCH-RSRP, RSSI, RSRP, and CSI-RSRP of the potential target base station in the 5G radio access system. Base station 120 can determine whether to add the potential target base station as a second node for user device 140.

In some embodiments, the measurement report includes a measurement result for mobility management. For example, as shown in FIG. 2 or 3, when base station 120 is the main node for user device 140 and manages mobility of user device 140 in the 5G radio access system, the request for the measurement report of the target BS in step 240 or 340 includes the request for both RSSI and RSRP of the potential target BS and base station 122. In such a case, the measurement report includes the measurement results, such as RSSI and RSRP, for mobility management.

Method 400 may also include receiving a handover command from the second BS. The handover command instructs user device 140 to: handover from the second BS to the first BS, or handover from the first BS to a third BS. For example, base station 120 is the main node for user device 140 and manages mobility of user device 140 in the 5G radio access system. When base station 120 receives the measurement report showing that the measured RSSI and RSRP of the potential target BS is 3 dB higher than that of base station 122, base station 120 sends a handover command to user device 140 to command user device 140 to change from base station 122 to the potential target BS in the 5G radio access system. User device 140 receives the handover command from base station 120 and changes its second node to the potential target BS.

As another example, base station 120 receives from user device 140 the measurement report containing measurement results in the 5G radio access system and measurement results in the LTE radio access system. The measurement results in the LTE radio access system show that signal quality between base station 120 and user device 140 would result in high bit error rates. Base station 120 sends a handover command to user device 140 to command user device 140 to change from base station 120 to base station 122.

Figure 5:
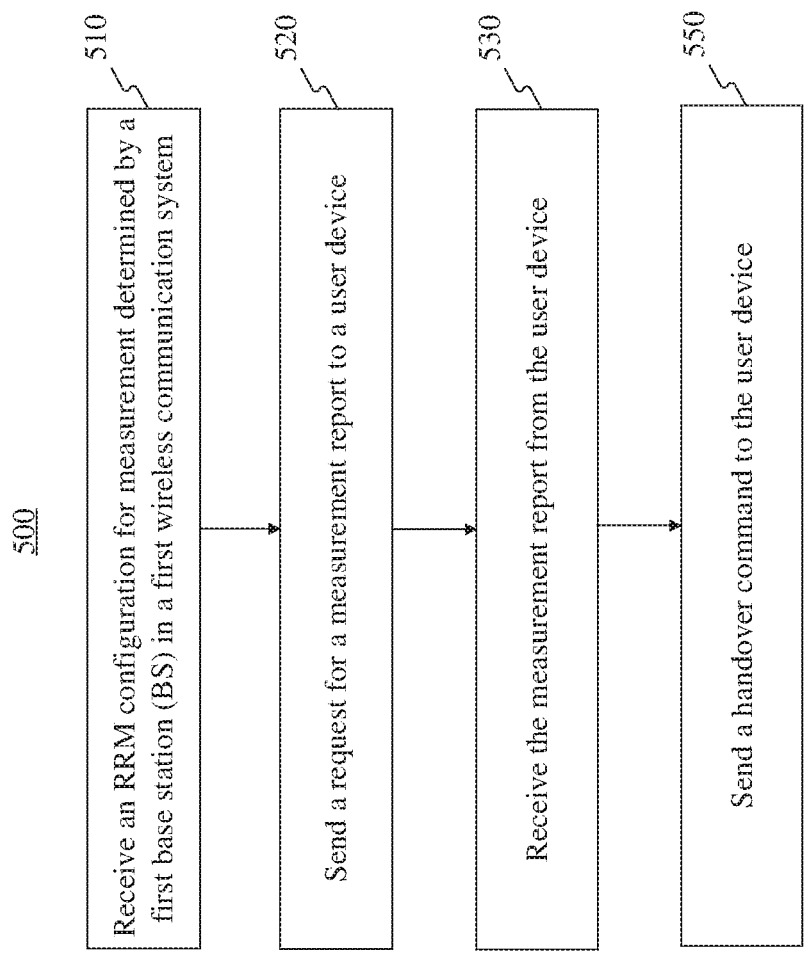
FIG. 5 is a flow chart of an exemplary radio resource measurement method between two wireless communication systems, according to some embodiments of the present application.

FIG. 5 is a flow chart of an exemplary radio resource measurement method 500 between two wireless communication systems, according to some embodiments of the present application. Method 500 may be practiced by base station 120. Method 500 includes receiving an RRM configuration determined by a first base station (BS) in a first wireless communication system (step 510), sending a request for a measurement report to a user device (step 520), receiving the measurement report from the user device (step 530), and sending a handover command to the user device (step 550). The measurement report includes a measurement result obtained from a measurement based on the RRM configuration in the first wireless communication system. The user device is communicatively connected to the first BS in the first wireless communication system and a second BS in a second wireless communication system.

Step 510 includes receiving an RRM configuration determined by a first base station (BS) in a first wireless communication system. For example, as shown in FIG. 2, user device 140 sends the RRM configuration of the target BS to base station 120 (step 230) after user device 140 receives from base station 122 the RRM configuration of the target BS (step 210). Base station 120 receives the RRM configuration of the target BS from user device 140 (step 230). The RRM configuration of the target BS in step 230 can include all or a subset of the requirements and relevant parameters of the RRM configuration of the target BS in step 210.

Alternatively, as shown in FIG. 3, base station 120 receives the RRM configuration of the target BS from base station 122 (step 320). The RRM configuration of the target BS in step 320 includes all or a subset of the requirements and relevant parameters of RRM configuration of the target BS in step 310.

Step 520 includes sending a request for a measurement report to a user device. For example, as shown in FIG. 2 or 3, when base station 120 operates as the main node for user device 140, base station 120 sends a request for a measurement report of the target BS to user device 140 (step 240 or 340). The request indicates the determined measurements and/or required measurement results that user device 140 needs to measure and report. When base station 120 is the main node for user device 140 and manages mobility of user device 140 in the 5G radio access system, the request for the measurement report of the target BS in step 240 or 340 includes, for example, the request for both RSSI and RSRP of the potential target BS and base station 122. When base station 120 is the main node for user device 140 and manages secondary node addition of user device 140 in the 5G radio access system, the request for the measurement report of the target BS in step 240 or 340 includes, for example, the request for SS/PBCH-RSRP, CSI-RSRP, and RSSI of a potential BS.

Step 530 includes receiving the measurement report from the user device. For example, as shown in FIG. 2 or 3, after user device 140 measures and collects measurement results in accordance with the RRM configuration of the target BS in step 210 or 310, user device 140 sends the measurement report of the target BS to base station 120 (step 260 or 360) in accordance with the request for the measurement report of the target BS in step 240 or 340. Base station 120 receives the measurement report of the target BS from user device 140 (step 260 or 360). Base station 120 can perform the handover determination (step 270 or 370) accordingly.

When base station 120 is the main node for user device 140 and manages mobility of user device 140 in the 5G radio access system, the measurement report of the target BS in step 260 or 360 can include, for example, RSSIs and RSRPs of the potential target BS and base station 122. User device 140 performs the measurement (step 250 or 350) in accordance with the RRM configuration of the target BS in step 210 or 310 in the 5G radio access system to obtain these RSSIs and RSRPs. When base station 120 is the main node for user device 140 and manages secondary node addition of user device 140 in the 5G radio access system, the measurement report of the target BS in step 260 or 360 can alternatively include, for example, SS/PBCH-RSRP, CSI-RSRP, and RSSI of the potential target BS. User device 140 performs the measurement (step 250 or 350) in accordance with RRM configuration of the target BS in step 210 or 310 in the 5G radio access system to obtain these SS/PBCH-RSRP, CSI-RSRP, and RSSI.

Step 550 includes sending a handover command to the user device. For example, as shown in FIG. 2 or 3, after base station 120 performs the handover determination (step 270 or 370) and determines a handover for user device 140, base station 120 sends the handover command to user device 140 (step 280 or 380) to command user device 140 to change its connection in the 5G radio access system from base station 122 to the potential target BS.

Alternatively, when the measurement results in the LTE radio access system show that signal quality between base station 120 and user device 140 would result in high bit error rates. Base station 120 can send the handover command to user device 140 (step 280 or 380) to command user device 140 for a handover from base station 120 of the LTE radio access system to base station 122 of the 5G radio access system. In such a handover, use device 140 releases its connection in the LTE radio access system and only keeps its connection with base station 122 in the 5G radio access system. Use device 140 no longer keeps the dual connectivity with the LTE and 5G radio access systems.

In some embodiments, step 510 includes receiving the RRM configuration from user device 140 or base station 122. For example, as shown in FIG. 2, base station 120 receives the RRM configuration of the target BS (step 230) including all or a subset of the RRM configuration of the target BS from user device 140 in step 210. As another example, base station 120 receives the RRM configuration of the target BS from base station 122 (step 320).

In some embodiments, step 520 can include sending a configuration index indicating one of a set of RRM configurations to be the RRM configuration to user device 140. For example, as shown in FIG. 2 or 3, when base station 120 operates as the main node for user device 140, base station 120 sends to user device 140 the request for a measurement report of the target BS (step 240 or 340) that includes a three-bit configuration index indicating one of eight possible RRM configurations. The three-bit configuration index includes, for example, "011" indicating that the fourth of eight RRM configurations includes the measurements that user device 140 needs to measure and report. Base station 120 can obtain a mapping between the configuration index and the set of RRM configurations from either base station 122 or user device 140.

In some embodiments, step 530 can include receiving from user device 140 another kind of measurement report containing the measurement report in the 5G radio access system. The another kind of measurement report is based on an RRM configuration determined by base station 120 to measure radio resources in the first and second wireless communication systems. For example, base station 120 sends the request for a measurement report of the target BS (step 240 or 340) that includes requests for measurement results in both the 5G and LTE radio access system from user device 140. User device 140 performs the measurement (step 250 or 350) in both the 5G and LTE radio access systems. User device 140 then sends to base station 120 a measurement report containing measurement results in the 5G radio access system and measurement results in the LTE radio access system.

In some embodiments, the requested measurement report can include all or a subset of measurement results obtained from the triggered measurement. For example, as shown in FIG. 2 or 3, user device 140 performs the measurement (step 250 or 350) in accordance with the RRM configuration of the target BS in step 210 or 310 in the 5G radio access system. Accordingly, user device 140 measures SS/PBCH-RSRP, RSSI, RSRP, and CSI-RSRP of a potential target base station and base station 122 in the 5G radio access system.

When base station 120 is the main node for user device 140 and manages mobility of user device 140 in the 50 radio access system, the request for the measurement report of the target BS in step 240 or 340 includes the request for both RSSI and RSRP of the potential target BS and base station 122. In such a case, the requested measurement report includes a subset of measurement results obtained from the triggered measurement.

Alternatively, when base station 120 is the main node for user device 140 and manages secondary node addition of user device 140 in the 5G radio access system, the request for the measurement report of the target BS in step 240 or 340 includes all of SS/PBCH-RSRP, RSSI, RSRP, and CSI-RSRP of the potential target base station in the 50 radio access system. Base station 120 can then determine whether to add the potential target base station as a second node for user device 140.

In some embodiments, the measurement report includes a measurement result for mobility management. For example, as shown in FIG. 2 or 3, when base station 120 is the main node for user device 140 and manages mobility of user device 140 in the 5G radio access system, the request for the measurement report of the target BS in step 240 or 340 includes the request for both RSSI and RSRP of the potential target BS and base station 122. In such a case, the measurement report includes the measurement results, such as RSSI and RSRP, for mobility management.

Method 500 may also include sending a request to user device 140 for reporting the measurement report. For example, when base station 120 intends to add a second node in the 5G radio access system for user device 140, base station 120 sends a request for user device 140 to report the measurement result. User device 140 sends the measurement report to base station 120 when receiving the request to report therefrom.

In some embodiments, method 500 can include determining whether to handover user device 140 based on the received measurement report. In response to the determination to handover the user device, step 550 includes sending a handover command to user device 140. The handover command instructs user device 140 to: handover from base station 122 to the potential target BS in the 5G radio access system, or handover from base station 120 of the LTE radio access system to base station 122 of the 5G radio access system.

For example, as shown in FIG. 2 or 3, base station 120 performs the handover determination (step 270 or 370) in accordance with the measurement report of the target BS in step 260 or 360. When a handover criterion is met, base station 120 determines the potential target BS for user device 140 to handover in the 5G radio access system. Base station 120 performs handover preparation with base station 122 (step 275) to prepare the handover from base station 122 to the potential target BS in the 5G radio access system.

Alternatively, when the measurement results in the LTE radio access system show that signal quality between base station 120 and user device 140 would result in high bit error rates, base station 120 determines a handover for user device 140 from base station 120 of the LTE radio access system to base station 122 of the 5G radio access system. Base station 120 can send the handover command to user device 140 (step 280 or 380) to command user device 140 for the handover from base station 120 of the LTE radio access system to base station 122 of the 5G radio access system. In such a handover, user device 140 releases its connection in the LTE radio access system and only keeps its connection with base station 122 in the 5G radio access system. User device 140 no longer keeps the dual connectivity with the LTE and 5G radio access systems.

When a handover criterion is met and base station 120 determines to handover, base station 120 sends handover command 280 to user device 140 to command user device 140 to: change its connection in the 5G radio access system from base station 122 to the potential target BS, or change its dual connectivity with the LTE and 5G radio access systems and connect only with the 5G radio access system.

Figure 6:
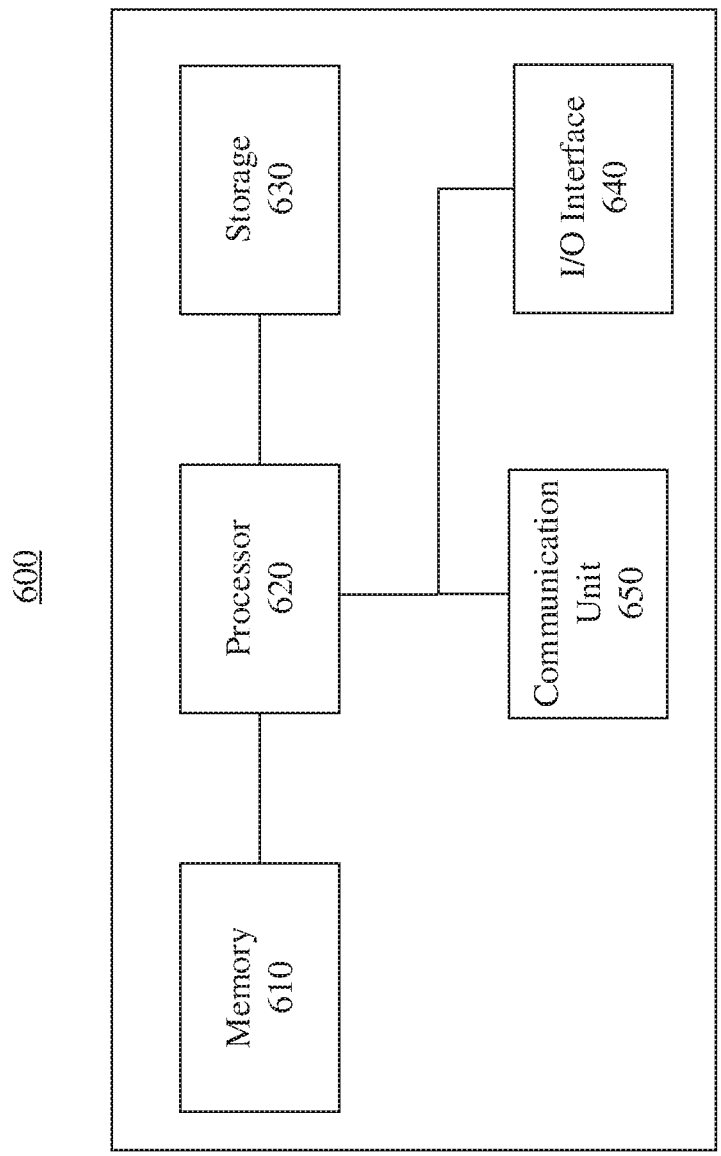
FIG. 6 is a schematic diagram of an exemplary network apparatus for radio resource measurement between two wireless communication systems, according to some embodiments of the present application.

FIG. 6 is a schematic diagram of an exemplary user device 600 for radio resource measurement between two wireless communication systems, according to some embodiments of the present application. User device 140 or 160 shown in FIG. 1 may be configured as user device 600. User device 600 includes a memory 610, a processor 620, a storage 630, an I/O interface 640, and a communication unit 650. One or more of these elements of user device 600 may be included for radio resource measurement in an idle, inactive, or suspended state in a wireless communication system. These elements may be configured to transfer data and send or receive instructions between or among each other.

Processor 620 includes any appropriate type of general-purpose or special-purpose microprocessor, digital signal processor, or microcontroller. Processor 620 can be representative of one or more processors in user device 140 or 160. Memory 610 and storage 630 may include any appropriate type of mass storage provided to store any type of information that processor 620 may need to operate. Memory 610 and storage 630 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 610 and/or storage 630 may be configured to store one or more programs for execution by processor 620 for radio resource measurement between two wireless communication systems, as disclosed herein.

Memory 610 and/or storage 630 may be further configured to store information and data used by processor 620. For instance, memory 610 and/or storage 630 may be configured to store received RRM configurations therein for user device 600.

I/O interface 640 may be configured to facilitate the communication between user device 600 and other apparatuses. For example, I/O interface 640 may receive a signal from another apparatus (e.g., a computer) including system configuration information for user device 600. I/O interface 640 may also output data of measurement results to other apparatuses.

Communication unit 650 may include one or more cellular communication modules, including, for example, a 5G radio access system, a Long-Term Evolution (LTE), a High Speed Packet Access (HSPA), a Wideband Code-Division Multiple Access (WCDMA), and/or a Global System for Mobile communication (GSM) communication module.

Processor 620 can be configured by one or more programs stored in memory 610 and/or storage 630 to perform operations of user device 140 described above with respect to the methods shown in FIGS. 2-5.

Figure 7:
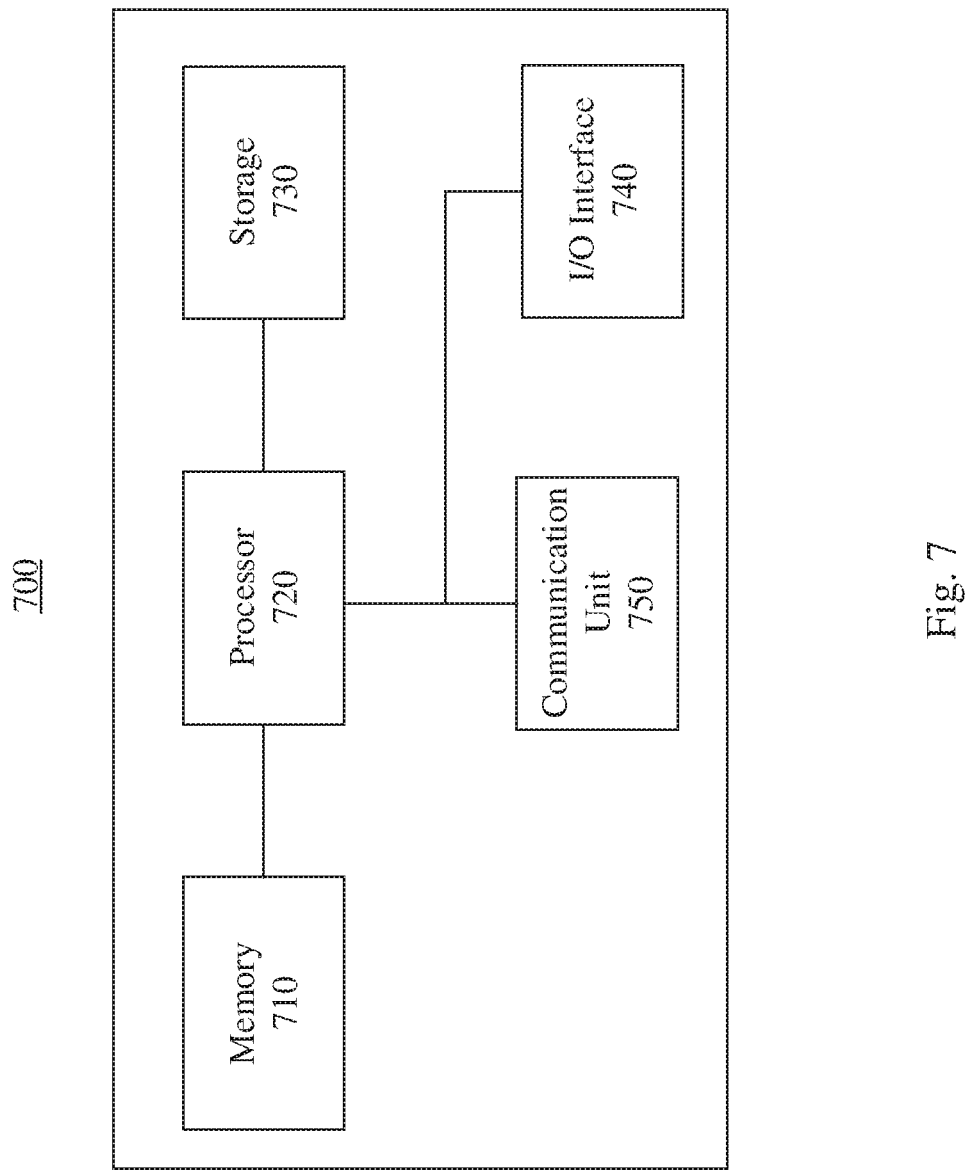
FIG. 7 is a schematic diagram of an exemplary user device for radio resource measurement between two wireless communication systems, according to some embodiments of the present application.

FIG. 7 is a schematic diagram of an exemplary network apparatus 700 for radio resource measurement between two wireless communication systems, according to some embodiments of the present application. Network apparatus 700 includes a memory 710, a processor 720, a storage 730, an I/O interface 740, and a communication unit 750. One or more of these elements of network apparatus 700 may be included for radio resource measurement in an idle, inactive, or suspended state in a wireless communication system. These elements may be configured to transfer data and send or receive instructions between or among each other. Base station 120 shown in FIG. 1 may be configured as network apparatus 700. Network apparatus 700 can be a base station, a relay station, a remote radio unit, a network node, or a home base station in a wireless communication system.

Processor 720 includes any appropriate type of general-purpose or special-purpose microprocessor, digital signal processor, or microcontroller. Processor 720 can be representative of one or more processors in base station 120. Memory 710 and storage 730 may be configured as described above for memory 610 and storage 630. Memory 710 and/or storage 730 may be further configured to store information and data used by processor 720. For instance, memory 710 and/or storage 730 may be configured to store RRM configurations for user devices 140 and 160.

I/O interface 740 may be configured to facilitate communication between network apparatus 700 and other apparatuses. For example, I/O interface 740 may receive a signal from another apparatus (e.g., a computer) including system configuration information for network apparatus 700. I/O interface 740 may also output data of RRM configurations to other apparatuses.

Communication unit 750 may include one or more cellular communication modules, including, for example, a 5G radio access system, a Long-Term Evolution (LTE), a High Speed Packet Access (HSPA), a Wideband Code-Division Multiple Access (WCDMA), and/or a Global System for Mobile communication (GSM) communication module.

Processor 720 can be configured by one or more programs stored in memory 710 and/or storage 730 to perform operations of base station 120 described above with respect to the methods shown in FIGS. 2-5.

Another aspect of the disclosure is directed to a non-transitory computer-readable medium storing instructions which, when executed, cause one or more processors to perform the methods, as discussed above. For example, instructions may be stored on a non-transitory computer-readable medium included in memory 610 and/or storage 630 of user devices for execution by processor 620, or in memory 710 and/or storage 730 of network apparatus 700 for execution by processor 720. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

The invention claimed is:

1. A method of a user device for radio resource measurement (RRM) between wireless communication systems, the method being executed by the user device which is communicatively connected to a first base station (BS) in a first wireless communication system and to a second BS in a second wireless communication system, the method comprising:
    obtaining a set of RRM configurations of a target BS from the first BS in the first wireless communication system;
    receiving, from the second BS in the second wireless communication system, a request for a measurement report, wherein the request for the measurement report comprises a configuration index indicating one of the set of RRM configurations to be an RRM configuration that includes determined measurements to be measured and/or required measurement results to be reported by the user device;
    performing a measurement of the target BS based on the RRM configuration and according to the request for the measurement report; and
    sending the measurement report to the second BS,
    wherein the measurement report includes a measurement result obtained from the performed measurement.

2. The method of claim 1, wherein the measurement result is for mobility management.

3. The method of claim 1, wherein sending the measurement report to the second BS includes sending:
    when a criterion for sending a measurement report is met, or
    when receiving from the second BS a request for reporting the measurement report.

4. The method of claim 1, wherein the measurement report is a first measurement report and the RRM configuration is a first RRM configuration, sending the first measurement report to the second BS including:
    sending to the second BS a second measurement report containing the first measurement report,
    wherein the second measurement report is based on a second RRM configuration determined by the second BS to measure radio resources in the first and second wireless communication systems.

5. The method of claim 1, further comprising:
    receiving a handover command from the second BS,
    wherein the handover command commands the user device to:
    handover from the second BS to the first BS, or
    handover from the first BS to a third BS.

6. The method of claim 1, wherein the first BS is configured to send the set of RRM configurations to the user device and the second BS.

7. The method of claim 1, wherein the first BS is configured to send the set of RRM configurations to the user device, and before receiving, from the second BS, the request for a measurement report, the method further comprises:
    sending the set of RRM configurations to the second BS.

8. A user device for radio resource measurement (RRM) between wireless communication systems, wherein the user device is communicatively connected to a first base station (BS) in a first wireless communication system and to a second BS in a second wireless communication system, the user device comprising:
  a memory storing instructions; and
  a processor configured to execute the instructions to cause the user device to:
    obtain a set of RRM configurations of a target BS from the first BS in the first wireless communication system;
    receive, from the second BS in the second wireless communication system, a request for a measurement report, wherein the request for the measurement report comprises a configuration index indicating one of the set of RRM configurations to be an RRM configuration that includes determined measurements to be measured and/or required measurement results to be reported by the user device;
    perform a measurement of the target BS based on the RRM configuration and according to the request for the measurement report; and
    send the measurement report to the second BS,
  wherein the measurement report includes a measurement result obtained from the performed measurement.

9. The user device of claim 8, wherein the measurement result is for mobility management.

10. The user device of claim 8, wherein the processor is configured to execute the instructions to cause the user device to send the measurement report to the second BS:
  when a criterion for sending a measurement report is met, or
  when receiving from the second BS a request for reporting the measurement report.

11. The user device of claim 8, wherein the measurement report is a first measurement report and the RRM configuration is a first RRM configuration, and the processor is configured to execute the instructions to cause the user device to send the first measurement report to the second BS by:
  sending to the second BS a second measurement report containing the first measurement report,
  wherein the second measurement report is based on a second RRM configuration determined by the second BS to measure radio resources in the first and second wireless communication systems.

12. The user device of claim 8, wherein the processor is further configured to execute the instructions to cause the user device to:
  receive a handover command from the second BS,
  wherein the handover command commands the user device to handover from the second BS to the first BS.

13. The user device of claim 8, wherein the first BS is configured to send the set of RRM configurations to the user device and the second BS.

14. The user device of claim 8, wherein the first BS is configured to send the set of RRM configurations to the user device, and the processor is further configured to execute the instructions to cause the user device to: before receiving, from the second BS, the request for a measurement report, send the set of RRM configurations to the second BS.

15. A second base station (BS) for radio resource measurement (RRM) between wireless communication systems, the second BS comprising:
  a memory storing instructions; and
  a processor configured to execute the instructions to cause the second BS to:
    receive a set of RRM configurations of a target BS determined by a first BS in a first wireless communication system, wherein the second BS is in a second wireless communication system;
    send a request for a measurement report to a user device, wherein the user device is communicatively connected to the first BS and the second BS, and the request for the measurement report comprises a configuration index indicating one of the set of RRM configurations to be an RRM configuration that includes determined measurements to be measured and/or required measurement results to be reported by the user device; and
    receive the measurement report from the user device,
  wherein the measurement report includes a measurement result obtained from a measurement of the target BS based on the RRM configuration and according to the request for the measurement report.

16. The second BS of claim 15, wherein the measurement result is for mobility management.

* * * * *